3,432,213
SELF-LEVELING AIR BEARING FIXTURE
Clarence R. Adams, Kirkland, Wash., assignor to The Boeing Company, Seattle, Wash., a corporation of Delaware
Filed Apr. 8, 1966, Ser. No. 541,342
U.S. Cl. 308—5
Int. Cl. F16c 32/00
3 Claims

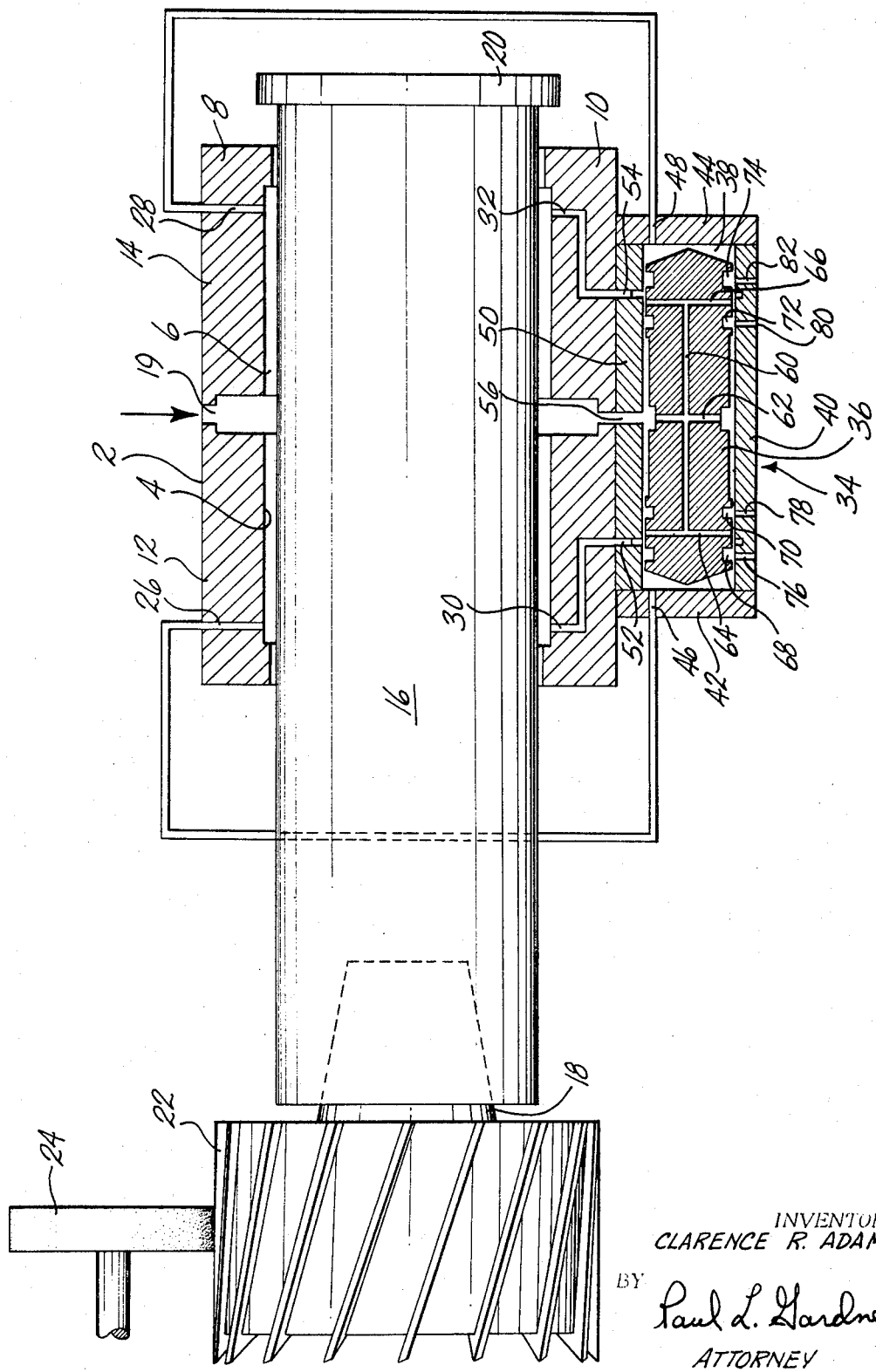

ABSTRACT OF THE DISCLOSURE

An air bearing for rotatably supporting a shaft while maintaining it in a substantially horizontal position. A pair of pressure sensitive fluid ports communicate with the upper forward and rear portions of the shaft housing, a pair of pressure delivery fluid ports substantially diametrically opposed to the pressure sensitive ports communicate with the lower forward and rear portions of the shaft housing, and a valve assembly communicates with both pairs of ports. The pressure sensitive ports sense pressure variations in the shaft housing caused by tilting of the shaft from its horizontal position, and the valve assembly operates in response to such sensed pressure variations to admit fluid under pressure to the appropriate pressure delivery port to return the shaft to its horizontal position.

---

The present invention relates to air bearing fixtures, and more specifically to an improved, self-leveling air bearing fixture for use in tool machining operations and the like.

In the tool machining art, it is known to employ an air bearing fixture for the tool holding member. Such an arrangement is shown, for example, in U.S. Patent No. 3,030,744 to Mueller. The fixture comprises a sleeve-shaped housing having a tool holding shaft mounted therein for rotation and axially reciprocating movement. A source of fluid under pressure communicates with the annular space between the housing and the shaft for providing an air bearing therebetween.

Such tool machining fixtures as Mueller's have not proven to be entirely satisfactory, however, because as the tool holding shaft is reciprocated axially in the housing, the shaft will deflect or tilt due to the excess of weight on one side of the housing. This creates obvious problems, for as the shaft deflects, the tool being ground will move closer to or further from the machining wheel, thereby causing machining inaccuracies.

Accordingly, it is the object of the present invention to provide an air bearing type of tool machining fixture wherein the tool holding shaft will remain substantially horizontal regardless of its axial position.

Briefly, the foregoing object has been realized by providing the housing with pressure sensitive fluid ports in either the upper or lower portions thereof and with fluid pressure delivery ports diametrically opposed to the pressure sensitive ports. The pressure sensitive ports sense any pressure variations in the annular space between the housing chamber wall and the shaft and control an axially reciprocable, fluid supported valve to regulate the distribution of fluid pressure through the pressure delivery ports to the housing chamber. Thus, if the shaft tends to deflect downwardly from front to rear, the pressure sensitive ports will sense the pressure variations caused by the shaft deflection and will position the value to admit fluid under pressure to either the lower rear or upper forward portion of the shaft (depending on whether the pressure delivery ports are located in the upper or lower portion of the housing). The air bearing itself, apart from the shaft leveling means, is quite similar to those shown in U.S. Patents Nos. 3,101,224 and 3,112,140 to Adams, the inventor in the instant application.

The foregoing and other objects, features and advantages will be apparent from the following more particular description of a preferred embodiment of the invention, as illustrated in the accompanying drawing.

In the drawing the single figure is an elevation view, partially in section, showing one preferred embodiment of the present invention.

Referring now to the drawing, the self-leveling air bearing fixture of the present invention is seen to comprise a horizontally extending cylindrical housing 2 having an inner peripheral wall 4 which defines a substantially cylindrical housing chamber 6. The housing includes an upper portion 8, a lower portion 10, and axially extending forward and rear portions 12 and 14, respectively.

A substantially cylindrical shaft 16 provided with tool holding means 18 on the forward end thereof extends axially through the housing chamber 6, and the outer diameter of the shaft 16 is smaller than the diameter of the housing chamber 6, whereby the shaft is free to rotate and reciprocate axially in the housing chamber. A fluid pressure inlet port 19 is provided in the housing for admitting fluid under pressure from a suitable source (not shown) to the annular space between the housing and shaft. The fluid admitted to the annular space will form a bearing between the housing and shaft. While any suitable fluid may be employed, air is preferred.

The shaft 16 is provided with a flange 20 on its rear portion for preventing it from sliding forwardly out of the housing chamber 6. Any suitable means (not shown) may be provided for rotating and axially reciprocating the shaft 16. A member to be machined, such as tool 22, is placed on the tool holding means 18 of the shaft 16 adjacent the machining wheel 24.

As the shaft 16 is reciprocated axially toward the forward end of the housing during a machining operation, the excess of weight at the forward end of the housing may cause the shaft to deflect or tilt in the annular space between the housing inner peripheral wall 4 and the shaft 16. This is obviously undesirable for it will cause the tool being machined to alternately move closer to and further from the machining wheel 24, thereby causing machining inaccuracies.

In order to overcome the tendency of the shaft to deflect as it reciprocates axially, the housing 2 is provided with two diametrically opposed sets of fluid port means 26, 28, and 30, 32 which communicate with the housing chamber 6. One set of ports 26, 28 is provided in the upper portion 8 of the housing 2 and are pressure sensitive ports for detecting pressure variations in the chamber caused by deflection or tilting of the shaft. One of the pressure sensitive ports 26 is provided in the forward end 12 of the housing 2, and the other port 28 is provided in the housing rear end 14.

The second set of ports 30, 32 are pressure delivery ports adapted to deliver fluid under pressure to the lower portion 10 of the housing 2. One port 30 is disposed in the forward portion 12 of the housing 2, and the other port is disposed in the rear portion 14.

Although the set of pressure sensitive ports 26, 28 are shown as being in the upper portion 8 of the housing 2, and the pressure delivery ports 30, 32 are shown as being in the lower portion 10, the fixture could obviously operate if the positions of the sets of ports were reversed. In other words, it makes no difference whether the pressure sensitive ports are located in the upper or lower portion of the housing, so long as the pressure delivery ports are located in the position diametrically opposed to the pressure sensitive ports.

Disposed between and communicating with the set of pressure sensitive ports 26, 28 and the set of pressure delivery ports 30, 32 is an axially reciprocable valve 34.

This valve comprises a substantially cylindrical body portion 36 adapted to reciprocate in an enclosed cylindrical chamber 38 defined by the interior walls of a hollow cylindrical sleeve 40 and a pair of end disks 42, 44. The end disks 42, 44 are provided with ports 46, 48, respectively, extending therethrough and communicating with the pressure sensitive ports 26, 28 and the valve chamber 38. The upper portion 50 of the sleeve 40 is provided with a pair of ports 52, 54 which communicate with the pressure delivery ports 30, 32 and the valve chamber 38. Also provided in the upper portion of the valve housing is a fluid passage port 56 which communicates with the bearing housing chamber 6 and the valve chamber 38.

The cylindrical valve body 36 is provided with means defining an axially extending port 60 and transversely extending ports 62, 64, 66. The centrally disposed transverse port 62 communicates with the bearing housing chamber 6 and the valve chamber 38. The outer transversely extending ports 64 and 66 are adapted to align with either of ports 52 and 54, respectively, when the valve body 36 is reciprocated in its chamber 38 to admit fluid under pressure from the housing chamber 6 and the ports 56, 62, 60, 64 or 66 to the lower forward or rear portion of the bearing housing chamber 6.

Circumferential grooves 68, 70, 72 and 74 are provided in the outer peripheral wall of the valve body 36 for exhausting fluid through exhaust ports 76, 78, 80 and 82 provided in the lower portion of the valve sleeve 40.

In operation, when the tool holding shaft 16 is in a substantially horizontal (desired) position, the pressure at each of the pressure sensitive ports 26, 28 and each of the valve ports 46, 48 will be substantially equal, and consequently the valve body 36 will remain in its centered position (the position shown in the drawing) in the valve chamber 38. If the shaft 16 tends to deflect or tilt downwardly from rear to front as it is moved forward during the grinding operation, the pressure variation caused by the tilting of the shaft will be sensed by pressure sensitive ports 26 and 28. There will be a build-up of pressure at the port 28 and a decrease in pressure at the other port 26. Accordingly, the pressure at the port 48 in the valve end disk 44 will increase, and the pressure at the port 46 in the other end disk 42 will decrease, thereby causing the valve body 36 to move to the forward or left end as viewed in the drawing. As the valve body 36 moves forward, the port 64 will align with the port 52 in the valve sleeve 40 and also with the pressure delivery port 30, thereby causing the pressure delivery port 30 to admit fluid under pressure to the bearing chamber 6. Fluid under pressure will thus pass through ports 56, 62, 60, 64, 52 and 30 to the lower forward end of the chamber 6. This will tend to urge the forward end of the shaft 16 upwardly, as viewed in the drawing, thereby tending to maintain it in its horizontal position.

If the shaft 16 is reciprocated axially so far toward the rear 14 in the bearing chamber 6 as to tend to tilt the shaft downwardly from front to rear, the pressure variations will be sensed by the pressure sensitive ports 26 and 28 to cause the valve body 36 to be moved to the right or rear in its chamber 38. The ports 66, 54 and 32 will become aligned to admit fluid under pressure to the lower rear end of the bearing housing chamber 6, thereby tending to urge the shaft 16 back to its horizontal position.

As can be seen from the foregoing, the present invention provides a novel air bearing type of tool machining fixture having leveling means associated with it for maintaining the tool holding shaft in a substantially horizontal position.

While the invention has been shown and described with reference to a preferred embodiment thereof, it will be understood by those skilled in the art that various changes in form and details may be made therein without departing from the spirit and scope of the invention. For example, each set of ports 26, 28 and 30, 32 in the housing may comprise more than two ports distributed axially along the housing chamber. It is intended, therefore, that the invention be limited only by the scope of the appended claims.

What is claimed is:

1. A self-leveling air bearing fixture comprising:
    an axially extending cylindrical housing having a forward wall, a rear wall and an inner peripheral wall defining a substantially cylindrical chamber; said housing and chamber including upper and lower portions and forward and rear portions;
    a substantially cylindrical shaft extending axially at least partially through said housing chamber; the smallest inside diameter of said housing chamber being greater than the largest diameter of said shaft, thereby defining an annular space between said housing and said shaft and permitting free rotation and axial reciprocation of said shaft in said housing chamber;
    fluid supply means communicating with said housing chamber for providing a fluid bearing between said housing and said shaft; and
    leveling means associated with said housing and said shaft for maintaining said shaft in a substantially horizontal position in said housing chamber; said leveling means comprising:
    an upper set of fluid ports comprising a forward port communicating with the upper forward portion of said housing chamber and a rear port communicating with the upper rear portion of said housing chamber; said upper forward and rear ports being substantially axially aligned and equally spaced from said forward and rear walls of said housing chamber, respectively;
    a lower set of fluid ports comprising a forward port communicating with the lower forward portion of said housing chamber and being substantially diametrically opposed to said upper forward port, and a rear port communicating with the lower rear portion of said housing chamber and being substantially diametrically opposed to said upper rear port; said lower forward and rear ports being substantially axially aligned and equally spaced from said forward and rear walls of said housing chamber, respectively;
    one of said upper and lower sets of fluid ports comprising pressure sensitive ports sensing pressure variations in said housing chamber caused by tilting of the shaft from its horizontal position, and the other of said sets of ports being pressure delivery ports delivering fluid under pressure to said housing chamber to maintain the shaft in a substantially horizontal position; and
    valve means connected to said source of fluid supply and disposed between and communicating with said upper and lower sets of fluid ports selectively supplying fluid to only one of the ports of said set of pressure delivery ports and for preventing the flow of fluid to the other of said set of pressure delivery ports in response to a difference in pressure between said forward and said rear pressure sensitive ports wherein said valve means includes means responsive to an increase of pressure at said forward port of said set of pressure sensitive ports to deliver fluid pressure to said rear port only of said set of pressure delivery ports, and means responsive to an increase in pressure at said rear port of said set of pressure sensitive ports to deliver fluid under pressure to said forward port only of said set of pressure delivery ports.

2. A self-leveling air bearing fixture according to claim 1, wherein said set of upper ports comprises said pressure sensitive ports and said set of lower ports comprises said pressure delivery ports.

3. A self-leveling air bearing fixture according to claim 1, wherein said valve means comprises: a valve housing including a forward wall, a rear wall and a peripheral wall; a fluid-supported, axially reciprocable valve body disposed in said valve housing; pressure sensitive orifices in the forward and rear walls of said valve housing communicating with said forward and rear pressure sensitive ports in said shaft housing; and pressure delivery orifices in said peripheral wall of said valve housing communicating with said forward and rear pressure delivery ports in said shaft housing.

References Cited

UNITED STATES PATENTS

| | | | |
|---|---|---|---|
| 2,692,803 | 10/1954 | Gerard | 308—9 |
| 2,879,113 | 3/1959 | De Hart | 308—122 |
| 3,200,671 | 8/1965 | Porath | 308—9 X |
| 3,251,633 | 5/1966 | Mohsin | 308—9 |
| 3,271,086 | 9/1966 | Deffrenne. | |
| 3,129,037 | 4/1964 | Ott. | |
| 3,126,233 | 3/1964 | Royle | 308—122 |
| 3,260,162 | 7/1966 | Atherton. | |

FOREIGN PATENTS 1,306,264  12/1962  France.

MARTIN P. SCHWADRON, *Primary Examiner.*

LUCIOUS L. JOHNSON, *Assistant Examiner.*

U.S. Cl. X.R.

308—9